June 14, 1966     V. TULLSEN ETAL     3,256,232
PIGMENTED RESIN EMULSION COMPOSITIONS
Filed Nov. 16, 1961
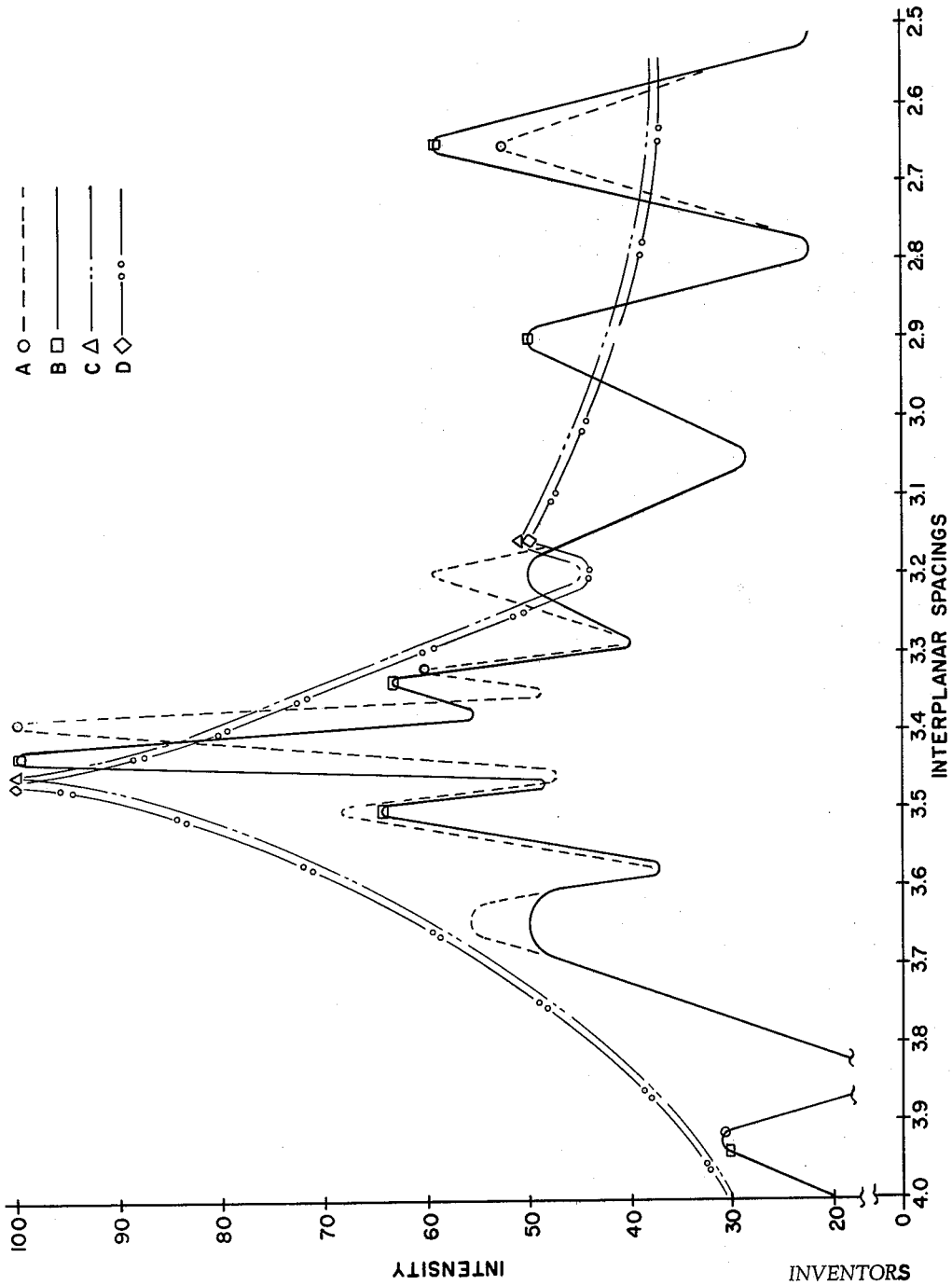
INVENTORS
VOLNEY TULLSEN
LEON KATZ
BY    JOHN TARAS
Norman Blumenkopf
ATTORNEY

3,256,232
PIGMENTED RESIN EMULSION COMPOSITIONS
Volney Tullsen, Scotch Plains, Leon Katz, Springfield, and John Taras, Alpha, N.J., assignors to General Aniline & Film Corporation, New York, N.Y., a corporation of Delaware
Filed Nov. 16, 1961, Ser. No. 152,787
12 Claims. (Cl. 260—29.6)

This invention relates to new and useful pigmented emulsion compositions, and in particular to so-called water emulsion resin paints, more commonly termed latex paints.

The earliest paints were pigmented oleaginous compositions which were relatively slow "drying." The set-up of the paint film was accomplished by a combination of oxidation and polymerization of the oils contained in the composition. Such oils are conventionally called drying or semi-drying oils. Usually these compositions contained a suitable solvent to effect viscosity reduction of the paint to permit the proper flow and brushing characteristics thereto. With the advent of modern chemistry and the tremendous strides in the discovery of new synthetic resins and plastics, it was soon found that major improvements in paints would be forthcoming by the use of such newly discovered synthetic resins and particularly the alkyl resins. The latter types of materials, especially when modified with drying oils or semi-drying oils, form the major basis for the film former of most paints. Of course, many other resins were or are still being used in such "oil" type paint systems to effect special improvements and for certain specific utilities. It was also known to employ a water base pigmented material as a coating composition, and while these were paints in the same sense that the oil base compositions were paints, nevertheless they were so termed with some misgivings by those in the art, due to the poor quality and generally temporary nature of the coating obtained from such compositions. In these early aqueous systems, the binder or film former was usually a water soluble gum or casein material. Over the years, improvements in these water soluble binders were effected but none approached the permanence of the coatings or films obtained from the oil systems. A major breakthrough in the water base system occurred with the advent of the pigmented latex compositions. Initially, some of these were merely pigmented natural rubber latex materials, which were hardly satisfactory. The introduction of synthetic latexes proved the answer to the success and tremendous popularity of the water base latex paints. It is conventional in the art to refer to such latexes as emulsion paints and while the term emulsion in the classical sense refers to a heterogeneous plural phase system containing at least one discrete liquid phase in discontinuous state dispersed in another continuous liquid phase, in the particular art with which this invention is concerned it has become accepted practice to refer in general to the latex systems as emulsions even though the dispersed phases are in the main, solids or semi-solids and the major film former is invariably a solid or semi-solid although there may be present in minor amounts additives which form a distinct and discrete discontinuous separate liquid phase.

In the broadest sense, the water base emulsion paints or latexes may be deemed to be pigmented oil-in-water emulsions wherein the "oil" refers to the heterogeneous phase or phases of the emulsion. In such systems, since water is the continuous phase, it is obvious that the pigment which is present is one of the dispersed phases, and this is of course in the solid state. The other major component is the film former which, in the case of the synthetic latex compositions, is usually a semi-solid polymeric elastomeric material. Emulsifying agents are invariably necessary to effect stability and proper dispersion of materials in the water. Other additives which may also be present are extenders, oils, resins, stabilizers, preservatives, anti-foaming agents.

The emulsion or latex paints have many obvious advantages over the so-called water base paints. The latex products may be readily diluted or thinned with water. They are very easily applied, and give excellent brushing characteristics. Tools such as brushes and the like are readily and easily cleaned simply by rinsing with water. The compositions are quick drying, free of any objectionable odor, and present no fire hazard. Latex compositions, by virtue of their various properties, are very easy to apply by one inexperienced in the field and at the same time obtain a very satisfactory job. Latex paints dry in two stages. In the first stage, immediately after application of the film, the emulsion breaks and the resin particles commence to coalesce to form a continuous homogeneous film. At this stage the film is relatively permeable to moisture and permits water to escape through the film. The second stage usually involves a complete setting of the film by oxidation, polymerization and total escape of volatile materials.

As pointed out above, the physical make-up of all latex paints is fairly similar. Present in the continuous water phase are at least the pigment, emulsifying agent and film former. In addition to the pigment, extenders are conventionally employed and these include diatomite which gives increased brightness to the films, water ground mica which results in good brushing, flow and leveling characteristics, magnesium silicates, barium sulfate, and the like. In addition to the primary film former, which is a synthetic elastomeric latex, and which may be an aqueous dispersion of polyvinyl acetate, a styrene butadiene copolymer dispersion, or an acrylic ester polymer dispersion, among others, resins and oils which may be incorporated in the latex include linseed oil, ester gum. linseed varnishes, alkyd resins (of the phthalic type), non-phthalic alkyd resins, coumarone-indene resins, etc. The primary pigments and the extender pigments may be present almost exclusively in the non-aqueous phases of the system, that is, in the oil, resin, or elastomer phase. Much of the pigment, on the other hand, may be present in the water phase as a discrete solid dispersion therein, and when so present during the subsequent drying of the paint film, it is necessary for the pigment to become bound up with or penetrate into the primary film forming material.

In order to effect the proper dispersion of the pigments in the emulsion or latex systems, and to obtain the full color value of the pigment, it is necessary that they be finely dispersed with the proper kind and amount of surfactant. The amount of the latter is fairly critical since an excessive quantity of these water soluble surface active materials will have a harmful effect upon the physical properties, and in particular the water resistance of the resulting paint film. An insufficient amount or the wrong kind of dispersing agent (that is, surfactant), will prevent the full color value of the pigment from being realized. Other factors which may be carefully controlled involve the viscosity of the composition and compatibility of the pigment formulations with the latex. Poor formulation may cause the paint to coagulate when the paint dispersion is added. Excessive changes of viscosity may occur and must be guarded against when the color dispersion is added to the latex.

It is generally recognized by technologists in this field that the best results are obtained with certain anionic or non-ionic surfactants or with mixtures of these agents.

Surface active compounds which are suitable non-ionics include the polyoxyalkylated derivatives of the alkyl phenols, for example, nonyl phenoxy polyoxyethylene ethanol (containing from 6 to 30 oxyethyl groups), polyoxyalkylated vegetable oils, e.g., Emulfor EL–719 (General Aniline & Film Corp.). Suitable anionic compounds include sodium salt of sulfonated naphthalene formaldehyde condensates, sulfonated aliphatic polyesters (Nekal WS–21, General Aniline & Film Corp.), ammonium, sodium and potassium salts of the sulfate and phosphate esters of the aforementioned non-ionic polyoxyalkylated compounds (e.g., Alipal CO–436, General Aniline & Film Corp.), dioctyl sodium sulfosuccinate and the alkali and ammonium salts of alcohol sulfates, for example, sodium lauryl sulfate. In addition to such organic surfactants, there may be used additionally inorganic complex phosphates such as tetrasodium pyrophosphate. Of the other additives described above, one type most commonly employed is the protective colloid or stabilizer, sometimes also termed thickener. Compounds which are useful for such purposes include methyl cellulose, carboxymethyl cellulose, zein, casein, soya protein, starches, dextrins, water soluble gums, e.g., gum karaya, gum arabic, gum acacia, gum tragacanth, and the like, alginates, bentonite, sodium polyacrylate, polyvinyl pyrrolidone, polyvinyl methyl ether, and the like. The use of anti-foamers is usually preferred in most cases, and small amounts of such compounds as pine oil, kerosene and siloxane defoamers (Anti-foam A, Dow Corning) may be used, and where desired, conventional preservatives such as mercuric chloride, thymol, sodium trichlorophenate, and the like. Where oxidizable and polymerizable resins and oils are present in the combination, conventional driers and drier accelerators may be used in conjunction therewith. These include the higher fatty acid metallic salts such as zinc oleate, zinc linoleate, lead resinate, cobalt naphthanate and the corresponding manganese compounds, also. Accelerators such as orthophenanthrolin and $\alpha,\alpha'$-dipyridyl may also be added as well as accelerators of the type disclosed in German Patent 1,058,665 relating to accelerators containing condensed rings on a diazine nucleus.

While innumerable pigments have been found useful in the latex paint systems above described, the selection of any particular pigment will of course be dependent upon the color desired, the cost picture, and the stability of the pigment under the conditions of use. Involved in the consideration of the cost picture is not only the actual price of the pigment per se but the color value which can be obtained therefrom. Thus it is obvious that an acceptable pigment, even though it is twice the cost of another pigment of similar color, is economically feasible where its color is more than double that of the other pigment. One of the empirical methods for determining the suitability of any particular pigment for use in pigmenting or coloring latex systems is a screening procedure involving the preparation of a lithographic varnish draw-down whereby it is possible to ascertain the economical feasibility for use in latex systems based upon the cost of the pigment, its brilliance and depth of shade and color strength.

Among the pigments which have achieved a tremendous acceptance in the commercial field because they have excellent fastness to light and heat, practically no solubility in common solvent and in general have outstanding chemical stability are the phthalocyanine pigments. All of the phthalocyanines heretofore known and used commercially have been classified primarily as blue and green pigments, the latter being less blue but nevertheless of sufficient greenness to warrant the characterization thereof as a green pigment. The art has, for many year, been searching for a yellow-green pigment in contradistinction to the known bluish greens obtained by the halogenation of the phthalocyanine molecule. Various attacks on this problem have been taken. One series of techniques is directed to the physical conditioning of the pigment to obtain a less blue-green. Such methods cause a shift towards the yellow, but the products are usually only yellow enough to be detected by an experienced colorist. All of the phthalocyanine green pigments thusly known to date exhibit a shift in hue towards the yellow which can just about be ascertained by the skilled worker. Assigning on an arbitrary scale this change in color which can just about be detected, a value of 5, it is found that the yellow green pigments herein contemplated for use in the latex compositions have a degree of yellowness on the above scale of from about 15 to 30.

Other attempts to overcome the disadvantage of the blue shade of the green phthalocyanines involved a blending with other commercially available yellow mineral pigments such as the siennas, ochres, and the lead chromates. None of these, however, make satisfactory blends. The siennas and ochres give dull, unattractive shades with phthalocyanine greens. The lead chromate yellows give somewhat more attractive shades but these mixtures have the disadvantages of being very sensitive to alkali as well as having low color strength. In addition, due to the high specific gravity of the lead chromate compounds, they are considered unsuitable for processing with the phthalocyanine pigments. Organic yellow pigments have been used and of these, the Hansa yellows give the most attractive yellow shades of green. But such mixtures, unfortunately, partake of the comparatively poor fastness properties, objectionable solubility in common solvents as well as poor heat stability of the Hansa yellows. Other organic yellow pigments are even less satisfactory than the Hansa colors. It has furthermore been well recognized in the art that even if were one to find a yellow pigment of satisfactory chemical and physical properties, it would be expected that a blend thereof with the phthalocyanine would have a duller shade than a single component pigment of equivalent hue.

It has now been discovered that a specific class of phthalocyanine pigments of the metallized type, while heretofore considered completely unacceptable for pigmenting purposes due to the poor brilliance and weakness of shade and color value exhibited to lithographic varnish testings for use in latex systems, exhibits to an outstanding degree brilliance and color value completely unexpected and unusual in the light of prior experiments, when the pigments are characterized as hereinafter described. Thus, pigments which have been found satisfactory in lithographic varnish compositions are invariably somewhat less satisfactory in other systems and in particular in oil-in-water emulsion systems. The pigments with which this invention is concerned, however, while unsatisfactory in lithographic varnish compositions, give outsanding brilliance and color value in oil-in-water emulsion systems of the latex type, which is contrary to the usual trend of loss in brilliance and color value and due to this outstanding and unexpected property of increased brilliance and color value, open new horizons for the use of such pigmented materials of the characteristics to be described.

The discovery, therefore, of the outstanding and unexpected strength of color, brilliance, and degree of yellowness of the halogenated copper phthalocyanines with which this invention is concerned, when employed in the latex compositions of this invention, is an advance in the art which has long been wanting. Those skilled in the technology of the halogenated phthalocyanines are well aware of the dullness which invariably results with even an infinitesimal increase in the yellowness of such compounds, whether the shift in dye is achieved by a physical conditioning treatment or by a chemical modification such as increasing the chlorine content of the phthalocyanine nucleus. The clorinated brominated copper phthalocyanines employed in the present invention not only have excellent brightness and purity of color, but unexpectedly are actually brighter than the old style halogenated phthalocyanine greens when employed in the compositions of the type herein contemplated.

The phthalocyanines which are herein contemplated comprise the copper phthalocyanines containing at least 12 halogen atoms in each phthalocyanine moiety, at least 2–10 of which are bromine and the remainder chlorine. The total halogen content of the molecule is selected so that the molecular weight of the total molecule is less than about 1325. Below this molecular weight and within the range of the halogen atoms specified above, the copper phthalocyanines exhibit a brilliance and depth of shade heretofore unobtainable with similar pigments in latices herein contemplated, provided they further are characterized as described below.

To more fully appreciate and understand the unexpected result of the employment of phthalocyanines with which this invention is concerned in latex compositions, it is of interest to make mention of the well known effect of the introduction of chlorine atoms into the phthalocyanine moiety. The unchlorinated phthalocyanines are possessed of a deep and rich blue color. Upon the introduction of chlorine, the shade shifts toward the green with a corresponding loss in color strength. The usual commercial phthalocyanine green contains on the average about 14 atoms of chlorine per phthalocyanine molecule. The difference in color strength between a non-halogenated blue and such a green is considerable. Since the hues are different, an exact estimation of this difference becomes a difficult matter but to the skilled colorist the strength of the two colors appears to be approximately in the ratio of 1:2, or in other words, the original blue has about double the strength of the converted green pigment. It is theoretically possible to introduce up to 16 atoms of chlorine for each phthalocyanine moiety which corresponds to 50.3% chlorine. In actual practice, it is extremey difficult to chlorinate beyond 48%, and further, there is such a tremendous loss in color strength at these high chlorine contents that the relatively insignificant increase in yellowness is hardly warranted by such a loss in color strength. Above about 45 to 48% chlorine an increase of 1% in the chlorine content causes a corresponding loss in strength of at least about 5 to 10%.

It was therefore completely unexpected that in copper phthalocyanines containing at least 12 halogen atoms the presence of at least two bromine atoms and the remainder chlorine would give rise not only to yellow pigments of a degree of yellowness never heretofore obtainable but would, in addition, lead to pigments which when employed in latex compositions as herein contemplated, would give rise to color strengths and brilliance of color intensity at least equal to, if not greater in most instances, than that obtainable from the non-halogenated products.

It is therefore an object of the present invention to provide compositions containing chlorinated brominated copper phthalocyanines as pigments for use in water emulsion compositions.

Another object of the present invention is to provide compositions containing chlorinated brominated copper phthalocyanines as pigments for use in water emulsion compositions of the latex type.

A further object of the present invention is to provide compositions containing chlorinated brominated copper phthalocyanines as pigments for use in synthetic latex compositions.

Still another object is to provide compositions containing chlorinated brominated copper phthalocyanines as pigments for use in emulsion paint compositions.

It is still another object of the present invention to provide water emulsion paints containing pigments of outstanding coloration and color strength.

It is still another object of our invention to provide processes for the preparation of compositions of the type above described.

Other objects will appear hereinafter as the description proceeds.

The brominated chlorinated copper pythalocyanines employed in the emulsion systems of this invention can in general be prepared by a variety of different methods. Thus the phthalocyanines may be prepared by starting with a bromochloro containing phthalic anhydride using the general methods disclosed in U.S. Patents 2,318,787 and 2,825,733 and others. Halogenation may be carried out in molten phthalic anhydride as shown in U.S. Patent 2,195,984. Halogenation may be effected by the use of a eutectic flux of aluminum chloride and sodium halide employing bromine and chlorine as the active halogenating agents. Further, an already brominated product may be chlorinated whereby the chlorine replaced the bromine until the desired ratio of bromine-chlorine is obtained.

The brominated chlorinated copper phthalocyanines obtained by the aforementioned procedures and containing at least 12 halogen atoms of which from 2 to 10 are bromine must further be conditioned in order that the full benefits of the present invention be realized. By proper conditioning of the instant phthalocyanine pigments there is obtained a form of pigment which is distinctly different from the same pigment conditioned by a conventional acid pasting procedure. In the latter the pigment is prepared by precipitation from a solution thereof in acid by drowning (i.e., dilution of acid), usually in water. It has been ascertained that this new and different pigment form is novel as emphasized by distinct crystallographic representation obtained by X-ray diffraction measurements and is crystallographically different from the same pigment (that is, chemically the same) which has been acid pasted in the usual manner.

The use of X-ray diffraction patterns to characterize crystal phases is well known and the various phases may be recognized by the presence or absence of characteristic interplanar spacings within the crystal as exemplified by the peaks in the X-ray diffraction record.

The patterns which are shown in the accompanying drawings (FIG. 1) have been obtained using a North American Phillips X-ray diffractometer. The radiation used is known as copper $K_\alpha$. The X-ray tube was run at 45,000 volts and 20 milliamperes. The slit system used 1° divergence and a 0.006 inch receiving slit. The intensity of the defracted beam was recorded by means of a Geiger counter and plotted against the interplanar spacings "$d$" which are calculated from the formula:

$$n\lambda = 2d \sin \theta$$

where $n=1$
$\lambda = 1.54 \text{ A}$
$d=$ interplanar spacing
$\theta=$ Bragg angle The curves as they appear in FIG. 1 are not identical to those obtained by the Geiger-counter apparatus but rather represent the originals without the wiggly oscillations which are normally present in such recordings.

In FIG. 1, four curves have been depicted, two representing the products of this invention, and the other two, acid pasted products of the same chemical composition. Curve A represents a product of this invention containing 2.2 atoms of bromine and 10.8 atoms of chlorine. Curve B represents a product of this invention containing 5.3 atoms of bromine and 8.9 atoms of chlorine. Curve C represents a product chemically identical to the product represented by Curve A, i.e., contains 2.2 atoms of bromine and 10.8 atoms of chlorine, but which has been acid-pasted. Curve D, again, represents a product chemically identical to the one used as a basis for Curve B, i.e., 5.3 atoms of bromine and 8.9 atoms of chlorine, but which has been acid pasted. From these curves it will be observed that each of them has the most promininet peak in the neighborhood of 3.3 to 3.5 A. These most prominent peaks in each instance (termed "base" peak) have been assigned a value of 100 on the intensity scale and the other peaks plotted relative thereto. "Major" or "prominent" peaks are those which have an intensity of 50% or more of the base peak, and are distinctively characteristics of the products of this invention. Other minor peaks, i.e., those having an intensity of less than 50% of the base peak, are discernible and the intensity values thereof will be given below.

An inspection of the curves in FIG. 1 shows that for curves A and B, which represent the products with which this invention is concerned, there are seven "major" peaks which represent the following interplanar spacings:

*Interplanar spacings*

| Peak: | |
|---|---|
| 1 | 2.63–2.64 |
| 2 | 2.88–2.93 |
| 3 | 3.16–3.23 |
| 4 | 3.30–3.31 |
| 5 | 3.36–3.40 |
| 6 | 3.48–3.50 |
| 7 | 3.60–3.68 |

The peak occurring at 3.36–3.40 A. is a general characteristic of the metallized halogenated thiocyanines and repersents the base peak as defined above. With this peak assigned a value in intensity of 100, the remaining six major peaks have intensities ranging from 50 to 68 as follows:

| Peak | Peak values |
|---|---|
| 1 | 52–59 |
| 2 | 50 |
| 3 | 50–59 |
| 4 | 60–63 |
| 6 | 64–68 |
| 7 | 50–56 |

Other minor peaks for the products represented by the curves A and B appear at the following interplanar spacings:

| Interplanar spacing | Intensity |
|---|---|
| 3.91–3.93 | 32–35 |
| 4.03 | 20 |
| 4.44 | 20 |
| 4.89–4.92 | 25–29 |
| 5.27–5.30 | 32–35 |
| 5.75 | 26–28 |
| 6.60–6.63 | 25–26 |
| 7.40–7.43 | 20–24 |
| 8.84 | 22–27 |
| 13.38–13.40 | 26–35 | and on the other end of the scale some minor peaks appear at:

| Interplanar spacing | Intensity |
|---|---|
| 2.50–2.51 | 37–40 |
| 2.26–2.34 | 26–32 |

The acid pasted products as depicted in curves C and D show the base peak at about the same position as the other two curves A and B in the area of about 3.42–3.44 A.; the only other significant peak as shown in the drawings appears at a spacing of about 3.15 A. and the intensity thereof is just about 50% of the base peak, there being no prominent or major peaks in the area in which the aforementioned six major peaks in the products with which this invention is concerned. This data clearly establishes that the products by which the outstanding achievements of the present invention arise are different and distinct crystal modifications of the same pigment treated in the above described conventional acid pasting procedure.

It is further pertinent to note that while the acid-pasted products are chemically identical to those conditioned by the methods hereinafter to be described, that is, as to bromine and chlorine content and both types yield identical Infra-red spectrograms, nevertheless, the difference in cystallographic form is apparently the basis for the exceptional pigment qualities of the products employed in the compositions of this invention.

It has been still further ascertained that in general the novel pigments employed herein have surface areas per unit weight of the pigment particles between about 20% and 90% of the area of the same pigment conditioned by precipitation from a solution thereof. In order to obtain pigments having the novel crystallographic characteristics described above, many techniques are available. These include acid milling as disclosed in U.S. Patent 2,716,649, aromatic sulfonic acid kneading or milling as disclosed in copending application Serial No. 847,454 filed October 20, 1959, now abandoned, acid milling with an acid stable, water-soluble inorganic salt (e.g., sodium sulfate) as described in U.S. Patent 2,840,568, acid slurrying to effect permutoid swelling of the pigment particles as described in U.S. Patents 2,765,318 and 2,765,319, and salt milling with an organic liquid as described in U.S. Patent 2,669,569.

It is of course understood that the methods by which the new and improved crystallographic pigment form is obtained form no part of the present invention and it is equally obvious that any method which results in the new type of pigment may be resorted to.

The general method for the preparation of pigmented latex paints involves the incorporation into an aqueous dispersion (usually termed emulsion in the art) of the synthetic film former of a disperison of the pigment also in an aqueous medium. The pigment disperison and the film former dispersion constitute the two major ingredients, as pointed out above, of the emulsion paint. The film former dispersion is generally available commercially and contains, in addition to these synthetic elastomers, minor amounts of dispersion or emulsifying agents, and may additionally contain some dispersed plasticizing materials. The pigment dispersion may be carried out in a variety of ways but the preferred procedure is to first treat the pigment with a selected dispersing agent or surfactant, either in a ball mill, colloid mill or wet hammer mill in any of a number of specially designed machines for dispersing solids and liquids which can be considered as modifications and improvements of turbomixers or colloid mills. In these processes the pigment as the dry powder or wet press-cake, is mixed with the dispersing agent and usually additional water, and conditioned or milled until there has been adequate treatment of the pigment with the dispersing agent, whereby satisfactory dispersion thereof can be obtained in the subsequent mixing with the latex composition. At the time of the formation of the pigment dispersion, there may also be added the selected defoamers, protective colloids, thickeners, pigment extenders, preservatives and the like. The amount of pigment to be incorporated into the latex base will of course be solely dependent upon the depth of shade desired. Depending upon the film forming material used and the viscosity of the final product, the total pigment concentration may vary from about 10% to about 50% by weight based on the total weight of the composition.

The following examples will serve to illustrate the present invention without being deemed limitative thereof. All parts and proportions referred to are by weight unless otherwise indicated.

*Example 1*

This example illustrates a method for the preparation of the pigments to be employed in the compositions of the present invention.

A. *Preparation of pigment.*—There are melted together at 160–165° C. the following components:

3600 parts aluminum chloride
750 parts sodium chloride

Then there are added the following:

100 parts cuprous chloride
575 parts copper phthalocyanine

Then there are added at 160–170° C. over 3 hours:

1100 parts bromine.

Then over 5 hours add 700 parts chlorine. The reaction mixture is then cooled to 150° C. and drowned in 20,000 parts of water containing 500 parts sulfuric acid. The mass is filtered, washed free of soluble salts and dried.

Yield: 1350 parts

*Analysis.*—32.5% bromine, which is equivalent to 5.3 atoms of bromine per mole. 24.3% chlorine, which is equivalent to 8.9 atoms of chlorine per mole.

The product of this example is the one which is depicted in the drawing as curve B.

The crude pigment is converted to a suitable pigmentary state by kneading one part in a dough mixer with 2 parts of technical toluene sulfonic acid (ca. 85% p-isomer, 15% o-isomer plus some m-isomer, water, sulfuric acid and toluene) for 10 hours during which time the temperature is raised to 100° C. The pigment is isolated by drowning the mass into 10 parts water followed by filtering and washing.

B. *Preparation of dispersed pigment.*—180 g. of the filtered press-cake of Part A containing, on a dry weight basis, about 60 g. of pigment, is charged into a 1 pint ball mill with 9 g. of the non-ionic surfactant nonyl phenoxy polyoxy ethylene ethanol (containing 65% ethylene oxide), 111 ml. water, and 750 g. of ½ inch flint pebbles. The mill is operated for 24 hours and the contents then discharged and the pH thereof adjusted to about 7.0.

*Example 2*

To 125 parts of an aqueous dispersion of polyvinyl acetate containing 50% dispersed solids, pH of the dispersion 4.5, there is first added a mixture of 10 parts dibutyl phthalate, and 20 parts ethylene glycol. There is then added 155 parts of the pigment slurry prepared in Example 1, Part B. A draw-down on heavy coated paper is then made with an applicator to give a film of 0.006 in. thick. After drying, the resultant film exhibits an excellent brilliant shade of yellow-green.

*Example 3*

Example 2 is repeated except that the pigment employed is similar to the one produced in Example 1 with the exception that the crude pigment prepared in Part A of Example 1 is conditioned by acid pasting in the conventional manner rather than by kneading with the toluene sulfonic acid. The resultant drawn-down is considerably weaker and of a much less yellow shade than the film prepared in Example 2.

*Example 4*

1 g. of the pigment dispersion of Example 1 is mixed with 100 g. of a white butadiene-styrene latex paint of the following composition:

776.1 g. Titanox RCRT
86.1 g. mica
455.0 g. water
3.1 g. potassium tripolyphosphate
5.4 g. Dow-Corning Anti-foam A
182.0 g. casein solution*

Ball mill 24 hours, then add:

1150.0 g. Dow Latex 512X (48% N.V.) (butadiene-styrene)
500.0 g. water

*Example 5*

Example 4 is repeated employing pigment as prepared in Example 3.

---

* Casein solution is prepared as follows: To
850.0 g. water (cold) add:
150.0 g. casein, then add:
150.0 g. 28% aqueous ammonia; heat to 60° for 30 minutes and add
27.0 g. Preventol I liquid.

*Example 6*

Draw-downs on heavy coated paper are prepared from the compositions of Examples 4 and 5 to give films 0.006 inch in thickness. A comparison demonstrates the vast superiority in brilliance and depth of color of the sample prepared from the composition of Example 4.

*Example 7*

The crude pigment prepared in Example 1-A is dispersed as follows:

60 g. pigment presscake of Example 1-A is mixed with 6 g. Emulphor EL–719 (castor oil and 42 moles ethylene oxide) and 3 g. Blancol (formaldehyde-naphthalene sulfonate condensation product). Add sufficient water to give 300 g. Mix until a smooth slurry is obtained, adjust pH to 9.5 and pass through a colloid mill set with a clearance of .002 inch.

*Example 8*

Examples 4, 5 and 6 are repeated using the pigment of Example 7 in Example 4. A similar improvement in brilliance and color is noted with the pigment of Example 1 as compared to the pigment of Example 3.

*Example 9*

Example 4 is repeated in a white polyvinyl acetate emulsion paint of the following composition:

A

| | Parts |
|---|---|
| Dibutyl phthalate | 20 |
| Hexylene glycol | 10 |
| Ethylene glycol | 35 |
| Water | 15 |
| Santonerse No. 3 | 2 |
| Gelva Emulsion B-30 | 243 |

[55% solids polyvinyl acetate; average particle size about 0.5 micron; pH 3.5 to 5.5; viscosity 1200–1400 cps.: Brookfield No. 3 spindle; 30 r.p.m. 25° C.]

B. Pigment slurry:

| | Parts |
|---|---|
| Water | 190 |
| Methocel 4000 cps., 2% | 190 |
| Tamol 731, 10% | 20 |
| Titanox RA50 | 149 |
| China clay | 109 |
| Cabot aluminum silicate | 50 |
| Calcium carbonate | 61 |

*Example 10*

Example 6 is repeated using the compositions of Example 9 as above and Example 9 containing 1 g./100 g. of pigment of Example 3. Results are similar to Example 6.

*Example 11*

Examples 9 and 10 are repeated using in place of the pigment dispersion of Example 1, a dispersion of the same pigment prepared as follows:

200 g. pigment presscake of Example 1–A 5 g. Nekal WS–21 (100%)
  [α-sodium sulfonate of the di-ester of succinic acid with diisobutylene carbinol]

25 g. nonyl phenoxy polyoxyethylene ethanol (65% ethylene oxide)

Mix for 30 minutes with very high speed mechanical agitation.

*Example 12*

The dispersed pigment of Example 1 is tested in a white acrylic resin emulsion paint. Similar improvements in brilliance and color strength are noted for the pigment of Example 1 as compared to the pigment of Example 3 (acid pasted and dispersed as in Example 1–B).

It is, of course, understood that the specific resin latex formulations given above are by way of illustration only and any of the commonly used elastomers and resins may be used including amyl halide, vinyl esters, acrylates, methacrylates and the like emulsions.

Other variations in and modifications of the described processes which will be obvious to those skilled in the art can be made in this invention without departing from the scope or spirit thereof.

We claim:

1. A pigmented water and resin emulsion composition comprising a continuous aqueous phase having emulsified therein a synthetic elastomeric latex polymer and a brominated chlorinated copper phthalocyanine pigment containing an average of at least 12 halogen atoms per molecule of which about 2 to 10 are bromine and the remainder chlorine, the said halogenated copper phthalocyanine pigment yielding an X-ray diffraction pattern exhibiting prominent peaks at the following interplanar spacings expressed in Angstrom units:

2.63–2.64
2.88–2.93
3.16–3.23
3.30–3.31
3.36–3.40
3.48–3.50
3.60–3.68 the said copper phthalocyanine pigment having a molecular weight of less than about 1325.

2. A pigmented water and resin emulsion composition comprising a continuous aqueous phase having emulsified therein a synthetic elastomeric latex polymer comprising polyvinyl acetate and a brominated chlorinated copper phthalocyanine pigment containing an average of at least 12 halogen atoms per molecule of which about 2 to 10 are bromine and the remainder chlorine, the said halogenated copper phthalocyanine pigment yielding an X-ray diffraction pattern exhibiting permanent peaks at the following interplanar spacings in Angstrom units:

2.63–2.64
2.88–2.93
3.16–3.23
3.30–3.31
3.36–3.40
3.48–3.50
3.60–3.68 the said copper phthalocyanine pigment having a molecular weight of less than about 1325.

3. A pigmented water and resin emulsion composition comprising a continuous aqueous phase having emulsified therein a synthetic elastomeric latex polymer comprising a butadiene styrene copolymer and a brominated chlorinated copper phthalocyanine pigment containing an average of at least 12 halogen atoms per molecule of which about 2 to 10 are bromine and the remainder chlorine, the said halogenated copper phthalocyanine pigment yielding an X-ray diffraction pattern exhibiting prominent peaks at the following interplanar spacings in Angstrom units:

2.63–2.64
2.88–2.93
3.16–3.23
3.30–3.31
3.36–3.40
3.48–3.50
3.60–3.68 the said copper phthalocyanine pigment having a molecular weight of less than about 1325.

4. A pigmented water and resin emulsion composition comprising a continuous aqueous phase having emulsified therein a synthetic elastomeric latex polymer and from about 10% to about 50% based on the total weight of the composition of a brominated chlorinated copper phthalocyanine pigment containing an average of at least 12 halogen atoms per molecule of which about 2 to 10 are bromine and the remainder chlorine, the said halogenated copper phthalocyanine pigment yielding an X-ray diffraction pattern exhibiting prominent peaks at the following interplanar spacings in Angstrom units:

2.63–2.64
2.88–2.93
3.16–3.23
3.30–3.31
3.36–3.40
3.48–3.50
3.60–3.68 the said copper phthalocyanine pigment having a molecular weight of less than about 1325.

5. A pigmented water and resin emulsion composition comprising a continuous aqueous phase having emulsified therein a synthetic elastomeric latex polymer comprising polyvinyl acetate and from about 10% to about 50% based on the total weight of the composition of a brominated chlorinated copper phthalocyanine pigment containing an average of at least 12 halogen atoms per molecule of which about 2 to 10 are bromine and the remainder chlorine, the said halogenated copper phthalocyanine pigment yielding an X-ray diffraction pattern exhibiting prominent peaks at the following interplanar spacings expressed in Angstrom units:

2.63–2.64
2.88–2.93
3.16–3.23
3.30–3.31
3.36–3.40
3.48–3.50
3.60–3.68 the said copper phthalocyanine pigment having a molecular weight of less than about 1325.

6. A pigmented water and resin emulsion composition comprising a continuous aqueous phase having emulsified therein a synthetic elastomeric latex polymer comprising a butadiene styrene copolymer and from about 10% to about 50% based on the total weight of the composition of a brominated chlorinated copper phthalocyanine pigment containing an average of at least 12 halogen atoms per molecule of which about 2 to 10 are bromine and the remainder chlorine, the said halogenated copper phthalocyanine pigment yielding an X-ray diffraction pattern exhibiting prominent peaks at the following interplanar spacings expressed in Angstrom units:

2.63–2.64
2.88–2.93
3.16–3.23
3.30–3.31
3.36–3.40
3.48–3.50
3.60–3.68 the said copper phthalocyanine pigment having a molecular weight of less than about 1325.

7. A pigmented water and resin emulsion composition comprising a continuous aqueous phase having emulsified therein a synthetic elastomeric latex polymer and a brominated chlorinated copper phthalocyanine pigment containing an average of about 5.3 atoms of bromine and about 8.9 atoms of chlorine, the said pigment yielding an X-ray diffraction pattern exhibiting prominent peaks at the following interplanar spacings expressed in Angstrom units:

2.63–2.64
2.88–2.93
3.16–3.23
3.30–3.31
3.40
3.48–3.50
3.60–3.68

8. A pigmented water and resin emulsion composition comprising a continuous aqueous phase having emulsified therein a synthetic elastomeric latex polymer comprising polyvinyl acetate and a brominated chlorinated copper phthalocyanine pigment containing an average of about 5.3 atoms of bromine and about 8.9 atoms of chlorine, the said pigment yielding an X-ray diffraction pattern exhibiting prominent peaks at the following interplanar spacings expressed in Angstrom units:

2.63–2.64
2.88–2.93
3.16–3.23
3.30–3.31
3.40
3.48–3.50
3.60–3.68

9. A pigmented water and resin emulsion composition comprising a continuous aqueous phase having emulsified therein a synthetic elastomeric latex polymer comprising a butadiene styrene copolymer and a brominated chlorinated copper phthalocyanine pigment containing an average of about 5.3 atoms of bromine and about 8.9 atoms of chlorine, the said pigment yielding an X-ray diffraction pattern exhibiting prominent peaks at the following interplanar spacings expressed in Angstrom units:

2.63–2.64
2.88–2.93
3.16–3.23
3.30–3.31
3.40
3.48–3.50
3.60–3.68

10. A pigmented water and resin emulsion composition comprising a continuous aqueous phase having emulsified therein a synthetic elastomeric latex polymer and from about 10% to about 50% based on the total weight of the composition of a brominated chlorinated copper phthalocyanine pigment containing an average of about 5.3 atoms of bromine and about 8.9 atoms of chlorine, the said pigment yielding an X-ray diffraction pattern exhibiting prominent peaks at the following interplanar spacings expressed in Angstrom units:

2.63–2.64
2.88–2.93
3.16–3.23
3.30–3.31
3.40
3.48–3.50
3.60–3.68

11. A pigmented water and resin emulsion composition comprising a continuous aqueous phase having emulsified therein a synthetic elastomeric latex polymer comprising polyvinyl acetate and from about 10% to about 50% based on the total weight of the composition of a brominated chlorinated copper phthalocyanine pigment containing an average of about 5.3 atoms of bromine and about 8.9 atoms of chlorine, the said pigment yielding an X-ray diffraction pattern exhibiting prominent peaks at the following interplanar spacing expressed in Angstrom units:

2.63–2.64
2.88–2.93
3.16–3.23
3.30–3.31
3.40
3.48–3.50
3.60–3.68

12. A pigmented water and resin emulsion composition comprising a continuous aqueous phase having emulsified therein a synthetic elastomeric latex polymer comprising a butadiene styrene copolymer and from about 10% to about 50% based on the total weight of the composition of a brominated chlorinated copper phthalocyanine pigment containing an average of about 5.3 atoms of bromine and about 8.9 atoms of chlorine, the said pigment yielding an X-ray diffraction pattern exhibiting prominent peaks at the following interplanar spacings expressed in Angstrom units:

2.63–2.64
2.88–2.93
3.16–3.23
3.30–3.31
3.40
3.48–3.50
3.60–3.68

References Cited by the Examiner
UNITED STATES PATENTS

| | | | |
|---|---|---|---|
| 2,276,860 | 3/1942 | Niemann et al. | 260—37 |
| 2,716,649 | 8/1955 | Brouillard | 106—288 |
| 2,904,523 | 9/1959 | Hawkins et al. | 260—17 |
| 3,010,929 | 11/1961 | Jones | 260—17 |

MURRAY TILLMAN, *Primary Examiner.*

LEON J. BERCOVITZ, *Examiner.*

J. ZIEGLER, *Assistant Examiner.*